(12) United States Patent
Laldin et al.

(10) Patent No.: US 10,326,326 B2
(45) Date of Patent: Jun. 18, 2019

(54) IPM MACHINE WITH SPECIALIZED WINDING FOR AUTOMOTIVE ELECTRIC VEHICLES

(71) Applicant: Faraday&Future Inc., Gardena, CA (US)

(72) Inventors: Omar Abdul Rahman Laldin, Hermosa Beach, CA (US); Dang Dinh Dang, Garden Grove, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 159 days.

(21) Appl. No.: 15/281,937

(22) Filed: Sep. 30, 2016

(65) Prior Publication Data

US 2018/0097431 A1    Apr. 5, 2018

(51) Int. Cl.
*H02K 3/14* (2006.01)
*H02K 3/28* (2006.01)
*H02K 3/12* (2006.01)

(52) U.S. Cl.
CPC ............. *H02K 3/28* (2013.01); *H02K 3/12* (2013.01); *H02K 3/14* (2013.01); *Y02T 10/641* (2013.01)

(58) Field of Classification Search
CPC .. H02K 3/12; H02K 3/14; H02K 3/18; H02K 3/28
See application file for complete search history.

(56) References Cited

U.S. PATENT DOCUMENTS

2017/0324294 A1* 11/2017 Schulz .................... H02K 3/28

FOREIGN PATENT DOCUMENTS

DE     102014223202 A1 *  5/2016  ............. H02K 29/03

OTHER PUBLICATIONS

Momen, F., et al., "Electric Motor Design of General Motor's Chevrolet Bolt Electric Vehicle," *SAE Int. J. Alt. Power* 5(2):2016.

* cited by examiner

*Primary Examiner* — Ramon M Barrera
(74) *Attorney, Agent, or Firm* — Knobbe Martens Olson & Bear LLP

(57) ABSTRACT

Certain aspects relate to designs for an interior permanent magnet (IPM) electrical machine stator having a plurality of continuous windings wound through the stator. Compared to existing designs, the disclosed stator design has an increased number of parallel conductors, an increased number of conductors per slot, increased tooth and slot width and number, and more compacted conductors, resulting in reduction in core losses, reduction in conductor losses, reduced harmonics in flux density, and improved winding reliability.

22 Claims, 11 Drawing Sheets

IPM MACHINE WITH SPECIALIZED WINDING FOR AUTOMOTIVE ELECTRIC VEHICLES

TECHNICAL FIELD

The systems and methods disclosed herein are directed to interior permanent magnet machines, and, more particularly, to interior permanent magnet machines having improved performance.

BACKGROUND

In recent years, high efficiency electric motors have become desirable to meet the challenges of providing power without the usage of fossil fuel sources, for example in hybrid and electric vehicles. Interior permanent magnet (IPM) motors have become popular due to their high efficiency performance, as an IPM electric machine is an increasingly efficient synchronous motor due to advances in high-energy permanent magnet technology, smart inverters, and digital controllers. IPM electric machines have magnets built into the interior of the rotor. The rotor is rotatable within a stator which includes multiple windings to produce a rotating magnetic field in the frame of reference of the stator.

SUMMARY

The electrical machine stator designs disclosed herein have several features, no single one of which is solely responsible for its desirable attributes. Without limiting the scope as expressed by the claims that follow, the more prominent features of the design will now be discussed briefly. After considering this discussion, and particularly after reading the section entitled "Detailed Description" one will understand how the features of the stator designs provide several advantages over traditional systems and methods.

One aspect relates to a three-phase electric machine comprising a rotor; a stator positioned around the rotor, the stator comprising first and second end faces; a plurality of teeth separated by a plurality of slots, wherein an interior of each of the plurality of slots defines a plurality of slot layer positions; and a plurality of continuous windings comprising a first plurality of conductors corresponding to a first phase of electric current, the first plurality of conductors radially inserted into a first subset of the plurality of slots of the stator, a second plurality of conductors corresponding to a second phase of electric current, the second plurality of conductors radially inserted into a second subset of the plurality of slots of the stator, and a third plurality of conductors corresponding to a third phase of electric current, the third plurality of conductors radially inserted into a third subset of the plurality of slots of the stator, each of the first, second, and third plurality of conductors having a phase lead end and a phase neutral end; wherein the stator contains three slots for each of the first, second and third phases of electric current per pole of the rotor; wherein each slot contains at least two of the plurality of continuous windings of a given phase of electric current; wherein each of the at least two continuous windings is wound in four layers in each slot, and wherein, for two continuous windings in each slot, in a first slot layer position of the plurality of slot layer positions and a second slot layer position of the plurality of slot layer positions adjacent the first slot layer position, the two continuous windings occupy alternating layer positions of the first and second slot layer positions.

In some embodiments, a first winding of the two continuous windings is wound around a circumference of the stator in a first direction (when viewed from a perspective looking toward a face of the stator), and a second winding of the two continuous windings is wound around a circumference of the stator in a second direction opposite the first direction (when viewed from the same perspective). In some embodiments, a first subset of the plurality of slots have two of the plurality of continuous windings of a given phase of electric current and a second subset of the plurality of slots have four of the plurality of continuous windings of a given phase of electric current. It will be appreciated that the discussed "directions" refer to the direction which a given conductor appears to travel around the circumference of the stator between its phase lead and phase neutral ends, which corresponds to the direction which current flows through the conductor around the circumference of the stator. During manufacture the described windings can be nested together, for example as an Archimedes spiral, and the nested spiral can be inserted into the stator slots. Thus, the described directions are not intended to require that the conductors be physically wound through the stator in the described direction or to imply any particular method of inserting the windings into the stator during manufacture, but rather to illustrate an example structure of one implementation of the disclosed vertical interleaving.

The stator can comprise an inner circumference, and outer circumference, and a backiron extending between the outer circumference and a base of the plurality of teeth. An outer slot layer position of the plurality of slot layer positions is adjacent to the backiron of the stator and an inner slot layer position of the plurality of slot layer positions is adjacent to the inner circumference of the stator. The phase lead end of a first winding of the two continuous windings can enter the stator at the outer slot layer position and the phase lead end of a second winding of the two continuous windings can enter the stator at the inner slot layer position. The phase neutral end of the first winding can exit the stator at the inner slot layer position, and wherein the phase neutral end of the second winding exits the stator at the outer slot layer position.

In some embodiments, each conductor of the first, second, and third plurality of conductors can comprise a rectangular cross-section defining first, second, third, and fourth exterior faces of the conductor, a plurality of end turns formed in the conductor, and a plurality of linear segments of the conductor, wherein pairs of successive linear segments of the plurality of linear segments are connected by an end turn of the plurality of end turns, and wherein each linear segment of the plurality of linear segments is positioned in a corresponding one of the plurality of slots with the first exterior face facing the rotor. Each end turn of the plurality of end turns can comprise first and second linear segments joined by a bent segment, wherein the bent segment includes a compound bend formed in the conductor at a peak of the end turn. The compound bend can be shaped such that, in a single winding of the conductor around circumference of the stator, successive linear segments are positioned in the alternating layers of the plurality of slot layer positions.

The first plurality of conductors can be wound through the first subset of the plurality of slots in a repeating block pattern including a first block and a second block. In the first block, a first conductor of the pair of conductors can be positioned in the first slot layer position in a first slot of the plurality of slots and, in the second block, the first conductor can be positioned in the second slot layer position in a second slot of the plurality of slots; and in the first block, a second conductor of the pair of conductors can be positioned in the second slot layer position in the first slot and, in the second block, the second conductor can be positioned in the first slot layer position in the second slot. The first plurality of conductors can comprise six conductors, and each of the first block and the second block can comprise linear segments of the six conductors positioned in the first and second slot layer positions across three adjacent slots of the plurality of slots, the six conductors comprising three of the pairs of conductors.

In some embodiments, the plurality of slots comprises ninety slots, and wherein each of the first, second, and third plurality of conductors comprises six conductors fed with the respective first, second, and third phases of electric current in parallel. In some embodiments, the phase lead end of each of the first, second, and third plurality of conductors is electrically coupled to a source of the respective first, second, and third phases of electric current. The phase neutral ends of each of the plurality of conductors are electrically coupled to one another to form six neutrals, where each of the six neutrals couples the phase neutral ends of one of each of the first, second, and third plurality of conductors.

Another aspect relates to a multi-phase electric machine comprising a rotor; a stator positioned around the rotor, the stator comprising first and second end faces; a plurality of teeth separated by a plurality of slots, wherein an interior of each of the plurality of slots defines a plurality of slot layer positions; and a plurality of continuous windings, each of the plurality of continuous windings comprising one of a plurality of conductors, each of a plurality of phase subsets of the plurality of conductors corresponding to one phase of a plurality of phases of electric current, each conductor of the plurality of phase subsets radially inserted into a corresponding one of a plurality of subset of the plurality of slots of the stator, wherein, for each phase subset of the plurality of phase subsets, in a first slot layer position of the plurality of slot layer positions and a second slot layer position of the plurality of slot layer positions adjacent the first slot layer position, a pair of conductors occupies alternating layer positions of the first and second slot layer positions in a respective subset of the first, second, or third subsets of the plurality of slots.

In some embodiments, a first conductor of the pair of conductors travels around a circumference of the stator in a first direction between its phase lead and phase neutral ends (when viewed from a perspective looking toward a face of the stator), and wherein a second conductor of the pair of conductors travels around the circumference of the stator in a second direction between its phase lead and phase neutral ends, the second direction being opposite the first direction (when viewed from the same perspective).

The stator can comprise an inner circumference, and outer circumference, and a backiron extending between the outer circumference and a base of the plurality of teeth. An outer slot layer position of the plurality of slot layer positions can be adjacent to the backiron of the stator and an inner slot layer position of the plurality of slot layer positions can be adjacent to the inner circumference of the stator. The phase lead end of a first conductor of the pair of conductors can enter the stator at the outer slot layer position and the phase lead end of a second conductor of the pair of conductors can enter the stator at the inner slot layer position.

Another aspect relates to a stator for an electric machine, the stator comprising an inner circumference and an outer circumference; first and second end faces; a plurality of teeth separated by a plurality of slots, wherein an interior of each of the plurality of slots defines a plurality of slot layer positions; a first continuous winding comprising first and second linear segments connected by a first end turn, the first end turn passing over the first end face over a number of slots, wherein the first linear segment is positioned in a first slot layer of a first slot and the second linear segment is positioned in a second slot layer in a second slot, the first and second slots separated by the number of slots; and a second continuous winding comprising third and fourth linear segments connected by a second end turn, the second end turn passing over the second end face over the number of slots, wherein the third linear segment is positioned in the second slot layer of the first slot and the second linear segment is positioned in the first slot layer in the second slot. For example, as shown in FIG. 1B, consider conductors B1 and B4 in the region between slots 1 and 10. Both B1 and B4 have linear segments positioned in each of slots 1 and 10, with B1 being in L8 in slot 1 and in L7 in slot 10, and with B4 being in L7 in slot 1 and L8 in slot 10. Further, the end turns of B1 and B4 between slots 1 and 10 will be over opposite faces of the stator.

In some embodiments, the first and second continuous windings wind around a circumference of the stator in opposing directions.

The stator can comprise a backiron extending between the outer circumference and a base of the plurality of teeth. An outer slot layer position of the plurality of slot layer positions can be adjacent to the backiron of the stator and an inner slot layer position of the plurality of slot layer positions can be adjacent to the inner circumference of the stator. A phase lead end of the first continuous winding can enter the stator at the outer slot layer position; and a phase lead end of the second continuous winding can enter the stator at the inner slot layer position.

In some embodiments, the phase lead end of each of the first and second continuous windings is coupled to a source of a phase of electric current. In some embodiments, the plurality of slots comprise 90 slots.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 3:
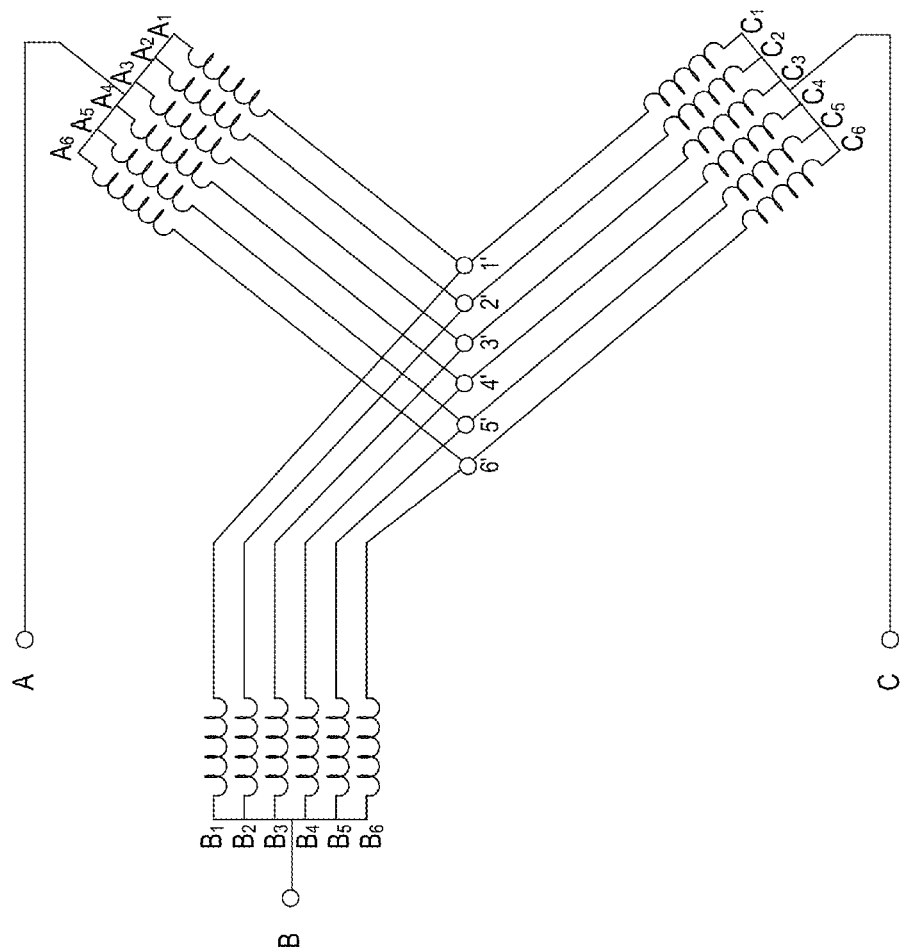
FIG. 3 illustrates a high-level schematic view of an example three-phase, 18 conductor stator winding.

One example of an electric motor includes a stator having a number of conductive windings wound through the stator to produce a rotating magnetic field in the frame of reference of the stator, a rotor rotatable within the stator, and an enclosure containing the windings, stator, and rotor. The rotor can have one or more permanent magnets embedded within it in some examples and thus the motor can be an interior permanent magnet motor. The stator can be of generally cylindrical form having first and second end faces, an inner diameter and an outer diameter, a backiron extending from the outer diameter to the base of a number of teeth, and the number of teeth extending from the backiron to the inner diameter. The teeth can be separated by a number of slots and the conductive windings can be positioned within the slots. In some embodiments of the electric motor, the windings can be continuous windings (e.g. not welded) that are inserted into the stator slots in a predetermined winding configuration such that each winding has a first end and a second end extending above one of the end faces of the stator. In one example three-phase motor, the winding pattern can include 18 conductors fed in parallel with six conductors per each of the three phases and eight layers of conductors per slot. An electrical schematic of a suitable configuration is illustrated in FIG. 3, where the three phases are connected in a wye configuration in which the end of one conductor from each phase is connected in common with the ends of two other conductors, one from each of the other two phases, to form six neutrals 1'-6' each connecting a conductor from all three phases. For example, neutral 1' includes the neutral end of conductors $A_1$, $B_1$, and $C_1$, neutral 2' includes the neutral end of conductors $A_2$, $B_2$, and $C_2$, and so on. The windings could also be connected in a delta configuration, where each set of six coils is connected between two different phases, ones set between phases A and B, one set between phases B and C, and one set between phases A and C. In the description below, the windings may be referred to as having a "phase" end and a "neutral" end for convenience, but this refers only to the fact that each winding has two ends that can be connected to electrically different points of a power supply system.

Core losses, conductor losses, and mechanical losses are three principal mechanisms for losses in high speed AC motors. Core losses, particularly when the IPM machine is operating at or near zero torque, are a key area where electric vehicles lose range. Conductor losses are significant particularly at high frequencies and arise from conductor resistance. Mechanical losses occur at the bearing of the motor. In general, this disclosure is related to design of a stator and windings for IPM machines resulting in improved machine performance, for example reduction of core losses, reduction of the skin effect and thus conductor losses, reduced harmonics in flux density, and improved performance of the stator winding.

Stator geometry (including dimensions of inner and outer circumferences of the stator; and shape, dimensions, and number of stator teeth and stator slots) is one factor of stator design. A stator can be a generally cylindrical structure having an inner circumference, an outer circumference, and first and second end faces. The stator can be a layered stack of a number of sheets cut, punched, or otherwise shaped into a desired profile. The profile can include a backiron portion along the outer circumference and a number of radial teeth extending toward the inner circumference from the backiron. Adjacent teeth can be separated by a slot, with the teeth and slots extending along the whole axial length of the stator between first and second end faces of the stator. In some stators the stator teeth have no tooth tips, and the slots are termed "open" as the slot opening is the same width as the slot itself. In some stators the stator teeth have small protrusions extending from either side of the tooth tips, and the slots are termed "partially closed" as the width of the slot opening is smaller than the width of the slot itself. Using various techniques well known by those skilled in the art, the stator winding is embedded into the slots according to a certain phase order. The stator design according to the present disclosure has a smaller backiron and wider tooth tips compared to some existing designs, thereby capturing more flux into the stator.

Slot fill factor is another consideration in stator design. This is the ratio of the aggregate cross-sectional area of all conductors in a slot to the cross-sectional area of the slot itself, with factors such as insulation and inefficient compacting of conductors decreasing slot fill factor. Increasing the slot fill factor can allow for higher efficiency in an electric machine without increasing stator size, as increasing the slot fill factor reduces phase resistance and consequently power loss for a given stator slot size. The slot fill factor can be increased by forming stator windings using conductors having a rectangular, rather than circular, cross-section. The disclosed stator design has an increased slot fill factor compared to some existing designs, achieved for example at least partly by having the conductors radially inserted into the stator slots rather than axially inserted.

Other design considerations with respect to stator windings relate to the winding resistance, which is a result of the skin effect, the proximity effect, and the effects of back electromotive force ("back EMF") on current density. The skin effect is the tendency of a time-varying electric current to concentrate near the surface of the conductor, such that the current density is highest between the outer surface of the conductor and a level called the skin depth and the current density decreases at greater depths. As the current frequency increases, the current flow is restricted to an increasingly thin layer near the conductor surface. The proximity effect refers to the influence of alternating current in one conductor on the current distribution in another nearby conductor, which causes current to flow in undesirable localized current loops or concentrated distribution. In combination with the skin effect, the proximity effect pushes the current to only a portion of the conductor skin. The current crowding due to proximity effect is further compounded by positioning of the stator steel and the resulting slot leakage flux. The shape of the slot, the steel, and the current enclosed in a path around the steel and across the slot pushes the resulting flux across the slot towards the slot opening. As the rotor rotates within the stator, the higher rate of change of the flux in this region induces voltages across the conductors, which in turn induce varying currents across the conductor cross section. As a result, the current flow crowds to a portion of the conductor facing the stator outer diameter. Increasing the motor speed further exacerbates the problem. Such current crowding reduces the effective cross-sectional area of the conductor, increasing the resistance of the conductor as current frequency increases. Some embodiments of the disclosed stator design have eight conductors per slot, resulting in a decrease in winding resistance compared to some existing designs.

Another consideration of stator design is the structure of the conductor of the winding. For example, conductor segments can be bent into U-shapes, such that the conductor segments form a U-shaped end turn with two legs. These conductor segments are often referred to as "hairpins" because of their shape. Such hairpin conductors can be inserted into two slots through one end face of the stator. A number of hairpin conductors can be inserted to fill the slots of the stator and the lead (non-weld) end of each leg can be bent as needed and welded to an adjacent hairpin leg according to the connection requirements of the windings. While this allows for axial insertion of the conductors, the many weld points at the lead ends of the hairpin conductors creates weak points in the insulating coating of the conductors. The weld points can lead to failure of the electric machine.

As another example of winding structure, a continuous conductor can be wound into a wave pattern and then radially inserted into the stator core through the slot openings. When these continuous conductors are formed using a conductor having a rectangular cross-section, the end turn forming the connections between the linear segments inserted into the stator conventionally include a transitional transposition of the conductor in which the conductor is folded over on itself. At the transitional transposition the winding has an increased thickness due to the conductor doubling over on itself which is typically flattened to have the same thickness as the conductor without doubling. Such flattening breaks the insulating coating on the conductor, creating a failure point at each end turn of the continuous winding. A typical winding can have 90 to 100 of such end turns, and multiple windings can be positioned in a single stator.

The above-described conductor structure problems, among others, are addressed in some implementations including continuous stator windings as described herein. The continuous stator windings include a conductor having a rectangular cross-section and an electrically insulating coating around the conductor. The conductor can be formed into a zig-zag or crank shape having a number of parallel linear segments connected by end turns, where each end turn includes a compound bend designed to not stress the insulation past its elongation or cracking point. The compound bend can be formed by applying force to the conductor in a first direction, thereby shaping a first bend in the conductor to form a u-shaped conductor having a, end turn and two linear segments, where the end turn includes a v-shaped bend and two straight segments on either side of the v-shaped bend that each connect to one of the linear segments. A second bend can be formed by applying force to the conductor in a second direction perpendicular to the first direction. The shape of the second bend can depend on the desired radius of the winding when circularly wound and positioned in a stator, as well as on the desired winding pattern, for example being one of an s-shaped bend, v-shaped bend, or asymmetrical v-shaped bend. Each continuous winding can be formed from a conductor having a rectangular cross-section defining first, second, third, and fourth exterior faces of the conductor, and the end turn scan be formed so that all of the linear segments of the conductor are positioned in the stator slots with the first exterior face facing the rotor. Thus the described conductors can include no weld or knuckle related failure points in the insulation at the end turns. It will be appreciated that each winding of the stator can include a weld for coupling the winding to an input at its phase lead end and/or an output at its phase neutral end. Successive end turns in a winding can extend alternately above the first and second end faces of the stator.

A stator according to the presently-disclosed design can have 90 partially-closed slots. In some embodiments, 18 continuous windings can be wound through the slots of the stator in a winding pattern as disclosed herein with eight layers of winding conductors per slot. In such embodiments, the stator can be provided with three phases of electric current, with groupings of six conductors carrying current of each phase. When all conductors are wound through the stator, they can nest with adjacent conductors at the end turns to form a compact arrangement. From its phase lead end, each time a conductor winds around the circumference of the stator it can alternate between positions in two adjacent slot layers due to the bend in the end turn, and after winding around the circumference can switch to alternating between an additional two adjacent slots until reaching its phase neutral end at the inner or outer layer of the stator. Accordingly, some embodiments of the disclosed stator design can have four circular rows or "crowns" of nested end turns while providing eight layers of conductors per slot due to each conductor alternating between adjacent slot layers as it winds once around the circumference of the stator.

The continuous windings can be radially inserted into the stator slots. Radial insertion of the winding affords a more compacted conductor configuration within each slot, thereby increasing the slot fill factor. An increased number of conductors can be positioned in each slot compared to prior art designs for similar stator topologies, with one example of the disclosed design having eight conductors per slot. While this increases the amount of insulation per slot due to each conductor having an insulating coating around its exterior faces, thereby reducing the slot fill factor, the increased number of conductors provides the benefit of reducing the skin effect, thereby decreasing losses due to conductor resistance. Further, the compacted conductor configuration resulting from radial insertion can stiffen the stator teeth in the radial direction, reducing vibration and noise during usage of the electric machine. The windings can be formed using the insulation-preserving continuous winding bends as described herein to achieve increased reliability compared to hairpin windings and continuous windings with flattened transitional transpositions.

The winding pattern includes an increased number of parallel conductors compared to prior art stator windings, thereby increasing efficiency. In one three-phase example, the winding pattern can include 18 conductors fed in parallel with six conductors per each of the three phases. The six conductors can be inserted into the stator in a blocked pattern in which the six conductors of one phase collectively occupy two layers of three adjacent stator slots. For example, consider conductors B1 and B4 in the region between slots 1 and 10. Both B1 and B4 have linear segments positioned in each of slots 1 and 10, with B1 being in L8 in slot 1 and in L7 in slot 10, and with B4 being in L7 in slot 1 and L8 in slot 10. Further, the end turns connecting the successive linear segments of B1 and B4 between slots 1 and 10 will be over opposite faces of the stator. Thus, as shown in the configuration of conductors B1-B6 depicted in FIG. 1B, a first linear segment of a first conductor (B1) can be positioned in a first layer (L8) in a first slot (slot 1), and a first linear segment of a second conductor (B4) of the six conductors can be positioned in a second layer (L7) in the first slot (slot 1). A first linear segment of a third conductor (B2) of the six conductors can be positioned in the first layer (L8) in a second slot (slot 2), and a first linear segment of a fourth conductor (B5) of the six conductors can be positioned in the second layer (L7) in the second slot (slot 2). A first linear segment of a fifth conductor (B3) of the six conductors can be positioned in the first layer (L8) in a third slot (slot 3), and a first linear segment of a sixth conductor (B6) of the six conductors can be positioned in the second layer (L7) in the third slot (slot 3). Accordingly, two layers (L8 and L7) of three adjacent stator slots (slots 1-3) are filled by the six conductors (B1-B6).

Each of the six conductors can continue winding around the circumference of the stator, with three conductors winding clockwise and the other three conductors winding counter clockwise. Accordingly, the six conductors will form one crown above one end face of the stator above the two layers (L8 and L7) and one crown above the other end face of the stator above the two layers (L8 and L7) between two sets of three adjacent stator slots. Further, due to the shape of the end turn, each conductor can alternate positions between two adjacent stator slot layers as they are wound around the circumference of the stator. Considering the example six conductor block of the previous paragraph, traveling clockwise around the stator a successive blocked pattern can have the same six conductors but with the layer positionings reversed. To illustrate using the configuration of conductors B1-B6 depicted in FIG. 1B, a second linear segment of the first conductor (B1) can be positioned in the second layer (L7) in a fourth slot (slot 10), a second linear segment of the third conductor (B2) can be positioned in the second layer (L7) in a fifth slot (slot 11), and a second linear segment of the fifth conductor (B3) can be positioned in the second layer (L7) in a sixth slot (slot 12). A second linear segment of the second conductor (B4) can be positioned in the first layer (L8) in the fourth slot (slot 10), a second linear segment of the fourth conductor (B5) can be positioned in the first layer (L8) in the fifth slot (slot 11), and a second linear segment of the sixth conductor (B6) can be positioned in the first layer (L8) in the sixth slot (slot 12).

The second linear segments of the first, third, and fifth conductors positioned in the fourth, fifth, and sixth slots can each be connected by an end turn to a respective first linear segment of the first, third, and fifth conductors positioned in the first, second, and third slots. The second, fourth, and sixth conductors can wind in an opposite direction around the circumference of the stator from the first, third, and fifth conductors. Accordingly, the second linear segments of the second, fourth, and sixth conductors positioned in the fourth, fifth, and sixth slots are not each connected by an end turn to respective first linear segments of the second, fourth, and sixth conductors positioned in the first, second, and third slots. Thus, the stator winding pattern can include repeating blocks of six conductors, where layer positions of complementary pairs of the six conductors alternate between successive blocks. Half of the windings for each phase can wind in a clockwise direction around the stator and the other half can wind in a counter-clockwise direction, and a pair of complementary conductors can include one that is wound clockwise and one that is wound counter-clockwise. Further, half of the windings can have a phase lead end entering the stator through an outer slot layer with the phase neutral end exiting the stator from an inner slot layer and half of the windings can have a phase lead end entering the stator through an inner slot layer with the phase neutral end exiting the stator from an outer slot layer, with a pair of complementary conductors including one having a phase lead end at the outer layer and one having a phase lead end at an inner layer. In the disclosed embodiments, all of the phase lead ends and all phase neutral ends can extend above the same end face of the stator.

Each of the six conductors can include an end turn as described between successive linear segments of the conductor. The end turn may cause the conductor to "skip" a number of stator slots between successive linear segments, and thus the first and fourth slots, second and fifth slots, and third and sixth slots in the illustrated example may be spaced apart, for example by nine stator slots. As used herein with respect to windings, "successive" refers to two components that are formed from proximate portions of the conductor while "adjacent" refers to conductor portions that are proximate to one another after insertion into the stator.

Once the two layers have been filled around the circumference of the stator in all slots that correspond to the electric phase of the conductor block, the six conductors can be inserted into two adjacent stator layers (third and fourth layers) in a similar, repeating block pattern until all stator slots corresponding to that phase are filled. Thus, each conductor occupies each stator slot layer, though this is accomplished by being positioned in alternating stator slot layers in successive slots through which the conductor is wound. Similar patterns can be implemented for other phases, such that a stator of a three-phase electric machine can have three repeating block patterns, wherein each repeating block pattern includes a number of conductors arranged in a first block and a second block, and where the conductors are arranged in a first layer configuration in a first block and in an alternate layer configuration in a successive block.

Repeating blocks of the three phases of a three-phase motor can be interleaved with one another, such that a first conductor block corresponds to a first phase, a second conductor block adjacent to the first conductor block corresponds to a second phase, and a third conductor block adjacent to the second conductor block corresponds to a second phase. This can continue around the circumference of the stator until all slots are filled.

A stator according to the disclosed design can be used with any suitable electric machine, for example an electric motor or generator. The disclosed embodiments will be described primarily in the context of the electric motor, however the disclosed concepts can also be applied to an electric generator.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Stator Design

Figure 1A:
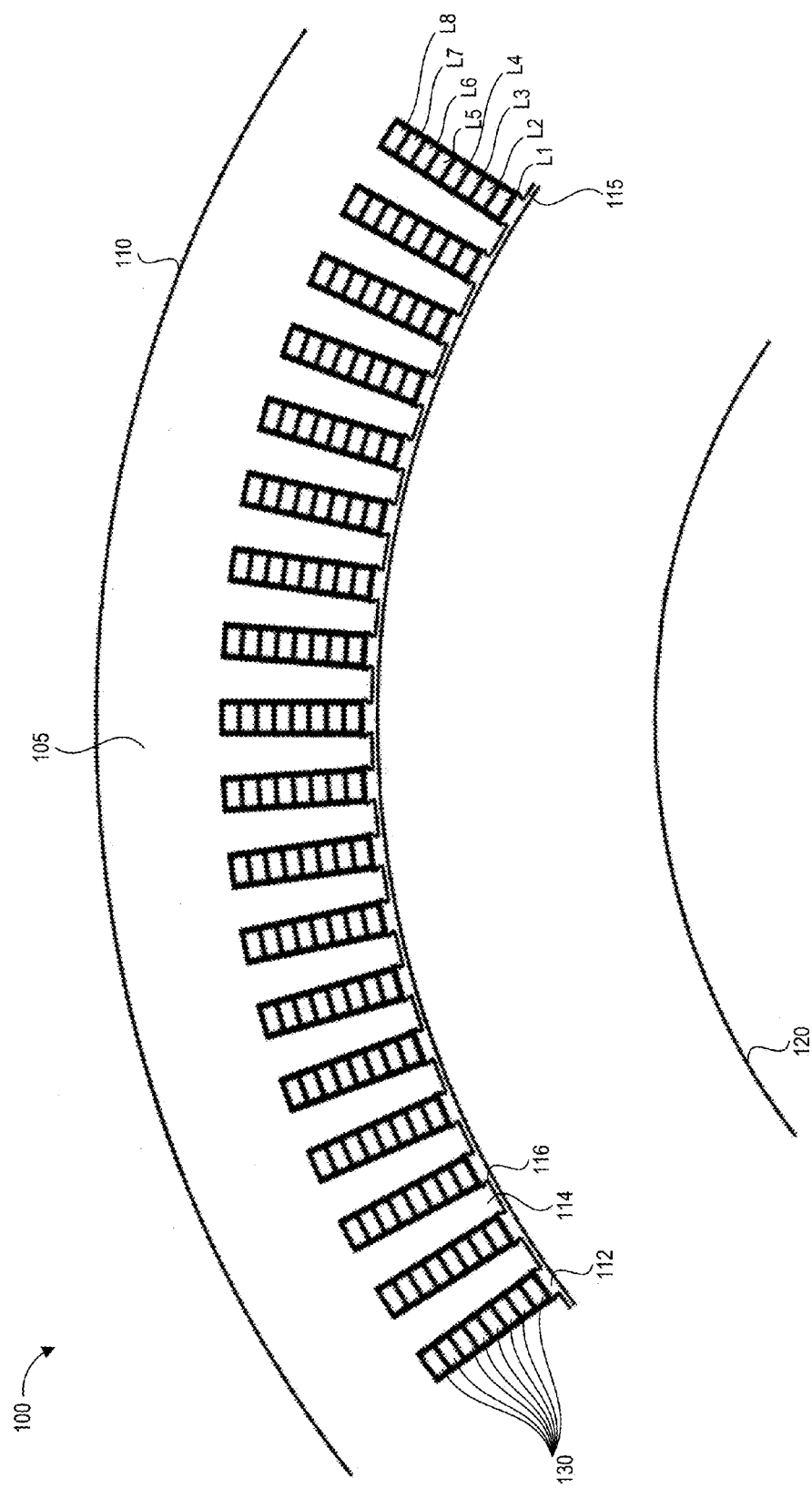
FIG. 1A illustrates a portion of an example stator configured according to the disclosed design.

FIG. 1A illustrates a cross-section of portion of an example stator 100 configured according to the disclosed design. The cross-sectional view of the stator 100 shows that it has an inner circumference 115 and an outer circumference 110, a backiron 105 extending from the outer diameter to the base of a number of teeth 114, and the number of teeth 114 extending from the backiron 105 to the inner circumference 115. Each of the teeth 114 can have tooth tips 116 protruding from either side of the end of the tooth along the inner circumference 115. Other embodiments can have tooth tips 116 of different shapes and sizes or no tooth tips. The teeth 114 can be separated by a number of slots 112 and a number of conductive windings 130 can be positioned within the slots to produce a rotating magnetic field in the frame of reference of the stator. The illustrated example has eight layers L1-L8 of conductors 130 per slot, however it will be appreciated that variations on the disclosed design can have greater or fewer conductors per slot.

The stator 100 can comprise a magnetically permeable material. Some embodiments of the stator 100 can be made of a stack of multiple thin layers of electrical steel, for example punched to produce the desired cross-sectional topology, stacked, and laser welded together. In one embodiment, the stator layers can be steel laminate with insulation and/or adhesive provided on both faces. One example of suitable steel has a thickness, per lamination layer, of 0.30 mm, a yield strength of 430 Mpa, and a maximum loss of 15 W/kg at 400 Hz@1T. Another example of suitable steel has a thickness, per lamination layer, of 0.35 mm, a yield strength of 427 Mpa, and a maximum loss of 18 W/kg at 400 Hz@1T. Another example of suitable steel has a thickness, per lamination layer, of 0.25 mm, a yield strength of 350 Mpa, and a maximum loss of 14.5 W/kg at 400 Hz@1T. Another example of suitable steel has a thickness, per lamination layer, of 0.356 mm, a yield strength of 358 Mpa, and a maximum loss of 1.45 W/lbs at 60 Hz@1.5 T. In some embodiments, the stator can include multiple sub-stacks.

Figure 4A:
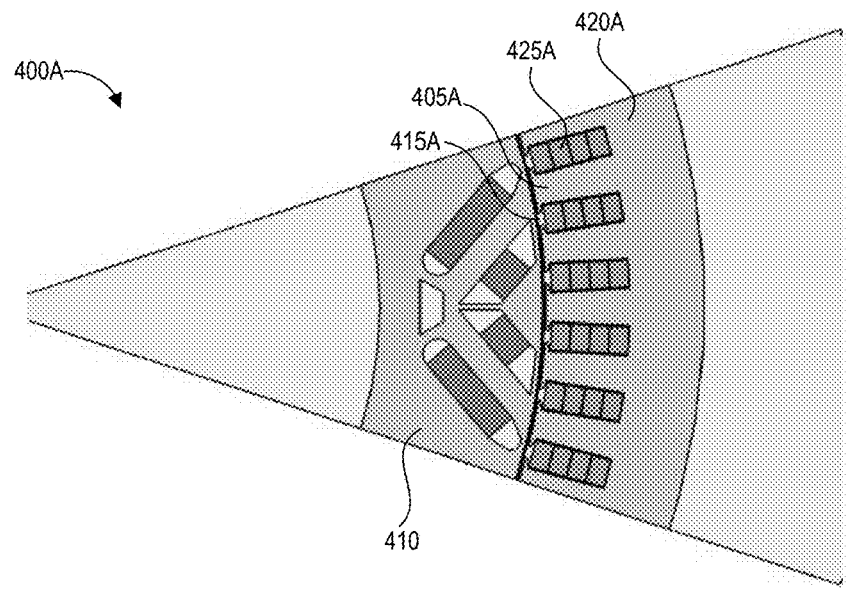
FIG. 4A illustrates an example of a known stator design.
Figure 4B:
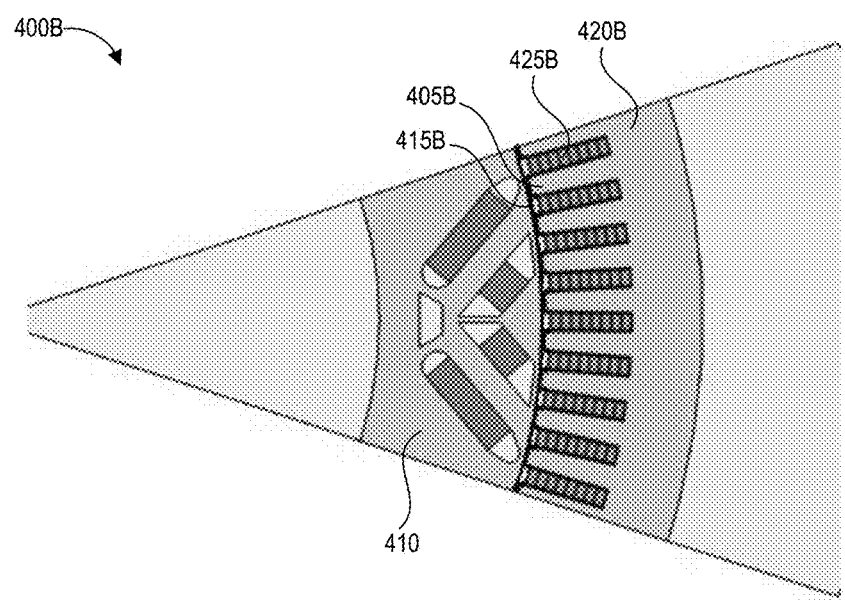
FIG. 4B illustrates an example of a stator design according to the present disclosure.

FIG. 1A also illustrates an example rotor 120 positioned concentrically within the stator 100. The rotor 120 can comprise a magnetically permeable material used to conduct magnetic flux. Though features of the rotor 120 are not illustrated, the rotor 120 can include embedded permanent magnets in some embodiments, for example in a two layered nested-V configuration as shown in FIGS. 4A and 4B. A rotational drive mechanism (not illustrated) is coupled to the rotor 120 and configured to rotate in association with the rotor 120, for example providing output torque to a load when the stator 100 is implemented in the context of a motor.

Figure 1B:
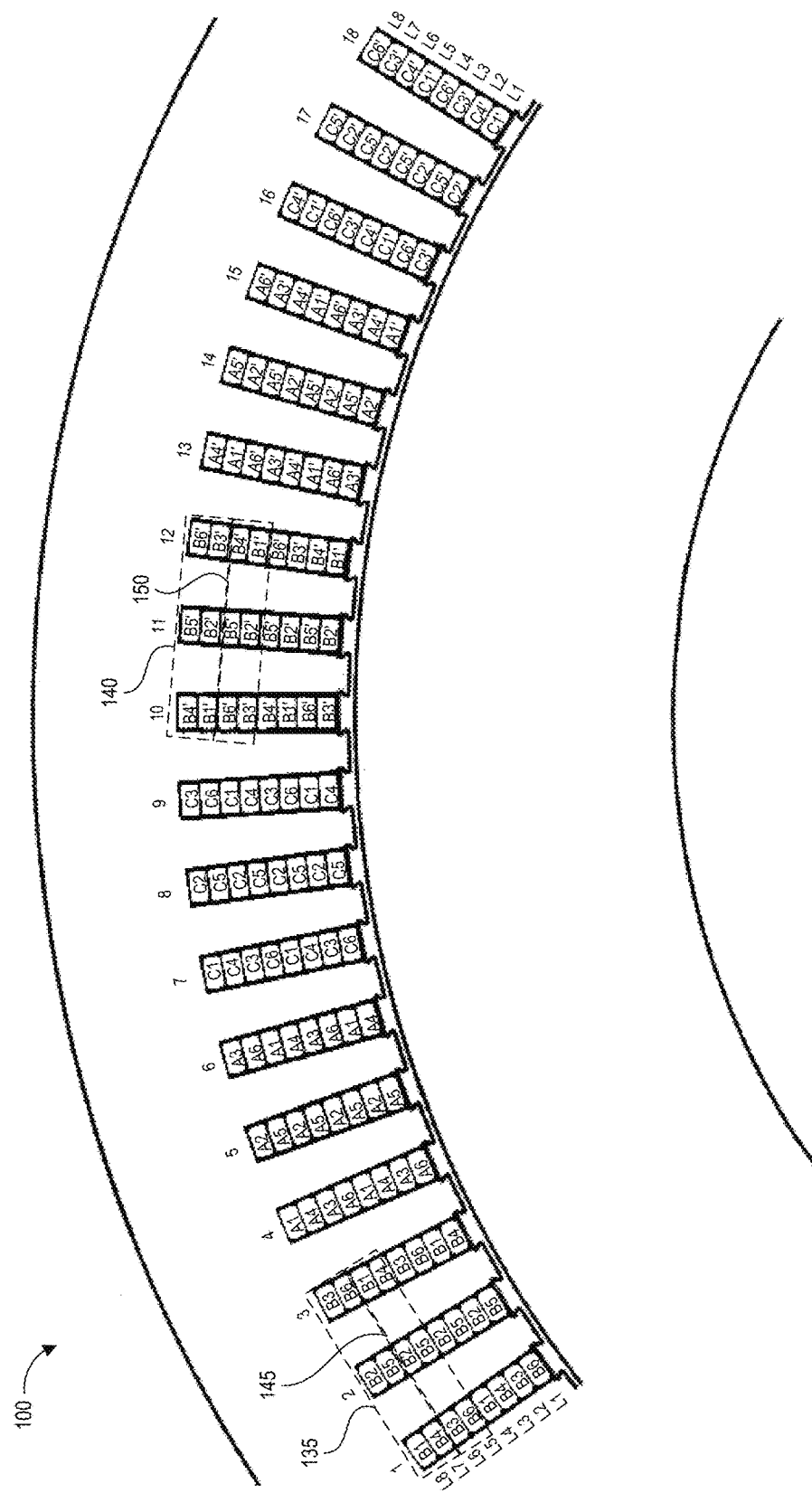
FIG. 1B illustrates an example conductor winding pattern for the stator of FIG. 1A.
Figure 1C:
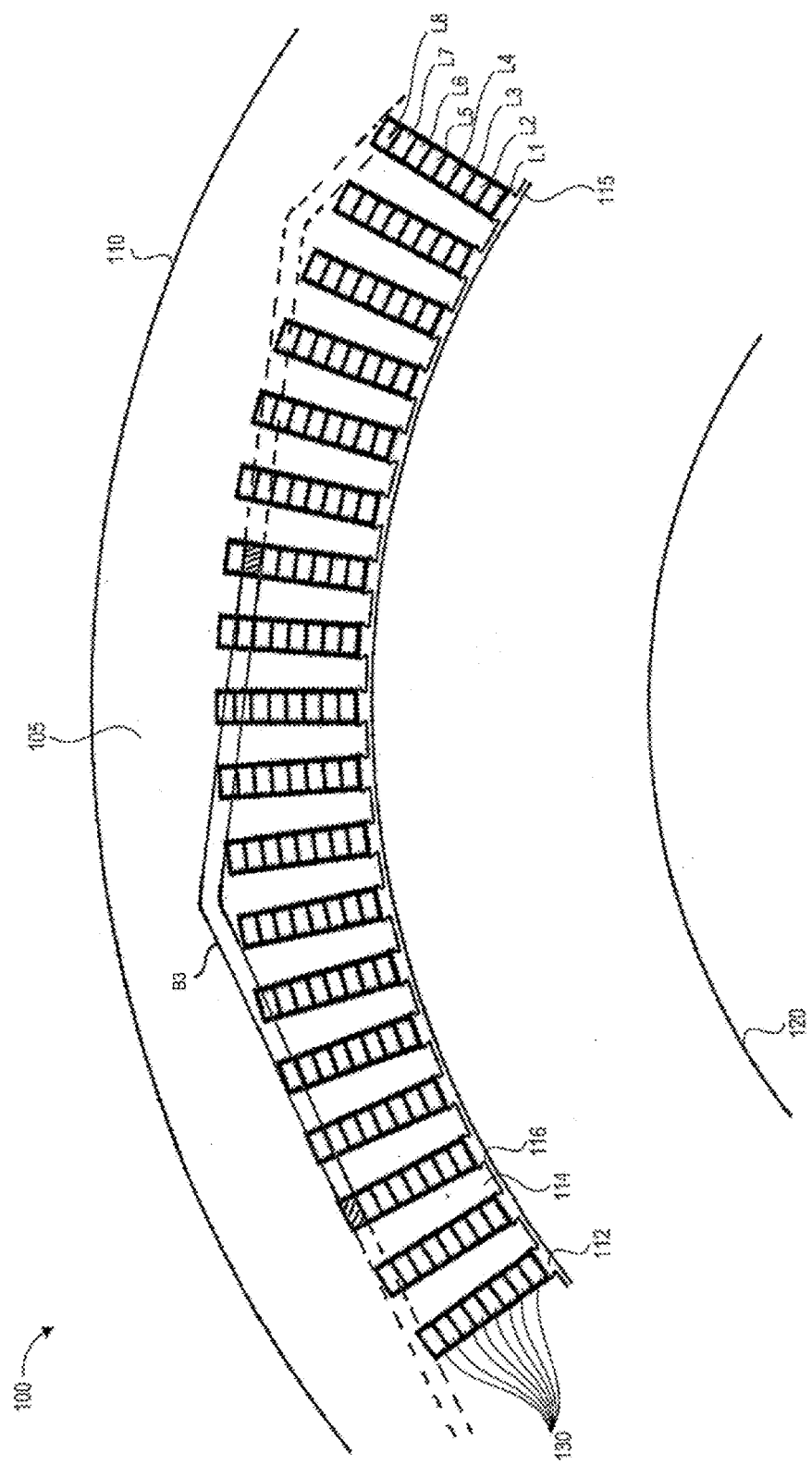
FIG. 1C illustrates winding A3 overlaid on FIG. 1A.
Figure 1D:
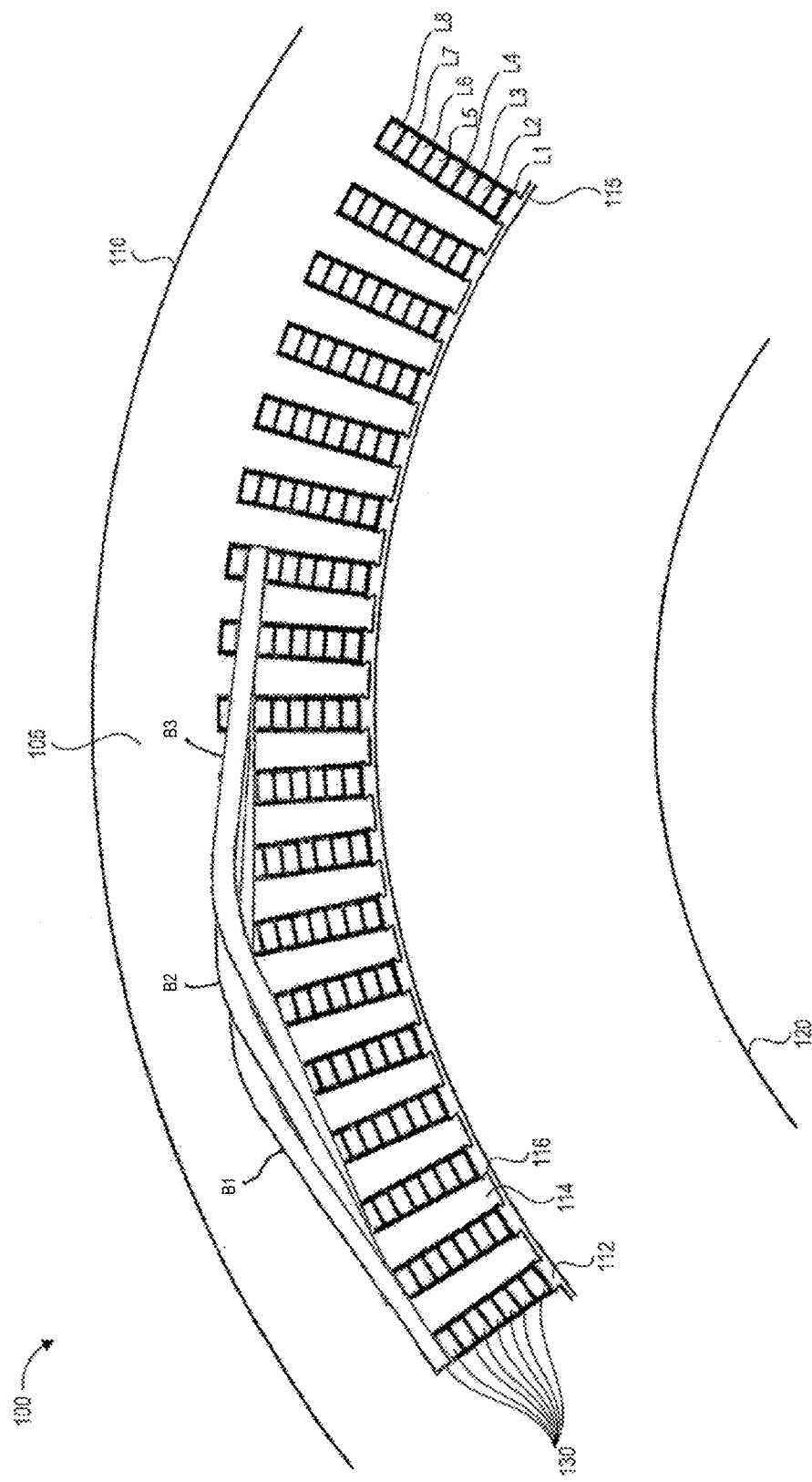
FIG. 1D illustrates windings A1, A2, and A3 overlaid on FIG. 1A.

FIGS. 1B, 1C and 1D illustrate an example conductor winding pattern for the stator 100 of FIG. 1A. FIG. 1B illustrates a cross-sectional view of the stator 100 with the linear segments of the conductors labeled to illustrate the winding pattern, and FIGS. 1C and 1D additionally illustrate end turn portions of some conductors overlying the cross-sectional view. For clarity of illustration only slots 1-18 are illustrated showing a complete portion of the winding pattern; in the 90 slot example stator described herein the portion of the winding pattern shown in FIG. 1B would be repeated five times around the circumference of the stator. This example is for a rotor with 10 poles, and there are 9 slots per pole, three dedicated to each of the different phases. Other examples can have 144 slots and up to 12 conductors per slot. Current flowing through the conductors in the example winding pattern can produce a rotating magnetic field in the frame of reference of the stator, for example driving motion of the rotor 120 when the stator 100 is implemented in the context of a motor.

The conductors in the slots are labeled as carrying either phase A, B, or C of current. Phases A, C, and B can be alternating currents that each have the same frequency and voltage amplitude but have a phase difference of one third the period and are thus separated by 120 electrical degrees. The layers of the slot are labeled as L1-L8 with inner slot layer L1 being closest to the inner circumference of the stator and outer slot layer L8 being closest to the backiron of the stator.

Six windings carry each phase around the stator, with windings A1-A6 carrying the A phase, windings B1-B6 carrying the B phase, and windings C1-C6 carrying the C phase. In the illustrated winding pattern each winding winds through stator slots around the circumference of the stator four times, so where winding labels are repeated in FIG. 1B this is to be understood as referring to the same winding. Further, each conductor is also labeled to illustrate the direction which the current flows through the conductor. Where windings A1-A6 are labeled as such, this indicates that current flows downward (or into the page of FIG. 1B) through these conductor segments of the winding. Where windings A1-A6 are labeled as A1'-A6', this indicates that current flows upward (or out of the page of FIG. 1B) through these conductor segments of the winding. Thus, the labels A1 and A1' refer to different conductor segments of the same winding, where the different conductor segments carry the same phase of current in opposite directions axially through the stator. Similar notation is applied for B1-B6, B1'-B6', C1-C6, and C1'-C6'.

As illustrated, each slot is occupied only by conductors carrying the same phase of current phases A, B, and C with the current flowing in the same direction. Three adjacent slots 1-3 each contain eight layers of conductors carrying B phase current in a first direction, the next three adjacent slots 4-6 each contain eight layers of conductors carrying A phase current in the first direction, the next three adjacent slots 7-9 each contain eight layers of conductors carrying C phase current in the first direction, the next three adjacent slots 10-12 each contain eight layers of conductors carrying B phase current in a second direction, the next three adjacent slots 13-15 each contain eight layers of conductors carrying A phase current in the second direction, and the next three adjacent slots 16-18 each contain eight layers of conductors carrying C phase current in the second direction. Though not illustrated, this pattern would begin again at slots 19, 37, 55, and 73 of the disclosed 90-slot stator. Some embodiments of a stator can have fewer or greater than 90 slots. Further, some embodiments of a winding pattern can have different numbers of pairs of alternating conductors per phase, for example one, two, four, or more. Some embodiments of a winding pattern with repeating blocks can be configured for a single phase motor, or for a polyphaser motor having two, four, or more phases. Some embodiments can have greater or fewer than eight slots layers per slot.

Further, each slot is occupied by either two or four conductors total, where a pair of vertically interleaved conductors alternate between slot layers. Vertical interleaving refers to two conductors exchanging positions between slots (like B1/B4, B2/B5, etc.) and horizontal interleaving refers to allowing two pairs of conductors to be exchanged on their way to the next slot (B1B4/B3B6, C1C4/C3C6, etc.). The slot layer alternation of a single conductor is shown by the cross-hatching on conductor B3 in FIG. 1C. As described above, this alternation can be due to the bend in the end turn connecting the linear conductor segments that are positioned in the illustrated slots. A first portion of the B-phase repeating block pattern formed by the layer alternation of the windings is called out by a first block 135 of the B-phase and a successive block 140 that are outlined in dashed lines. A second portion of the B-phase repeating block pattern formed by the layer alternation of the windings is called out by a third block 145 of the B-phase and its successive block 150 also outlined in dashed lines. These dashed line boxes will be understood as being shown for highlighting the repeating block feature and not for depicting any structure of the stator. As shown, blocks 135, 140, 145, and 150 each include all six B-phase windings B1-B6.

In block 135, B1 is positioned in slot 1 layer L8, B4 is positioned in slot 1 layer L7, B2 is positioned in slot 2 layer L8, B5 is positioned in slot 2 layer L7, B3 is positioned in slot 3 layer L8, and B6 is positioned in slot 3 layer L7. Due to the shaping of the end turns described above, the two layers L8 and L7 are formed by a single circular row of the nested windings. The adjacent circular row occupying layers L6 and L5 horizontally interleaves conductors B3 and B6 into slot 1 and horizontally interleaves conductors B1 and B4 into slot 3. As shown in block 145, B3 is positioned in slot 1 layer L6, B6 is positioned in slot 1 layer L5, B2 is positioned in slot 2 layer L6, B5 is positioned in slot 2 layer L5, B1 is positioned in slot 3 layer L6, and B4 is positioned in slot 3 layer L5.

In block 140 the layer positionings of pairs of conductors B1-B6 are reversed or alternated relative to their positionings in block 135. In block 140, B4' is positioned in slot 10 layer L8, B1' is positioned in slot 10 layer L7, B5' is positioned in slot 11 layer L8, B2' is positioned in slot 11 layer L7, B6' is positioned in slot 12 layer L8, and B3' is positioned in slot 12 layer L7. In block 150 the layer positionings of pairs of conductors B1-B6 are reversed or alternated relative to their positionings in block 145. In block 150, B6' is positioned in slot 10 layer L6, B3' is positioned in slot 10 layer L5, B5' is positioned in slot 11 layer L6, B2' is positioned in slot 11 layer L5, B4' is positioned in slot 12 layer L6, and B1' is positioned in slot 12 layer L5.

The configuration of blocks 135 and 145 is repeated four times in slots 1-3 to fill all eight slot layers L1-L8 with the six conductors B1-B6. Similarly, the configuration of blocks 140 and 150 is repeated four times in slots 10-12 to fill all eight slot layers L1-L8 with the six conductors B1-B6. Though not illustrated, at slot 19 the pattern of block 135 would be repeated and at slot 28 the pattern of block 140 would be repeated, etc. around the circumference of the stator. Similar repeating patterns are illustrated for the A and C phase conductors.

The illustrated winding pattern includes horizontal interleaving of four of the six conductors per phase, as illustrated by the differences between blocks 135 and 145 in slots 1 and 3 and between blocks 140 and 150 in slots 10 and 12. This horizontal interleaving can reduce losses due to circulating currents generated by rotation of magnets of the rotor within the stator relative, for example, to a winding pattern that repeats blocks 135 and 140 again in place of blocks 145 and 150. After a conductor that is horizontally interleaved in the winding pattern is wound completely around the circumference stator, for example between layers L8 and L7, the conductor is bent into a cross-over portion that positions it correctly for winding again around the circumference of the stator between a next two slot layers, for example L6 and L5. To compact this cross-over some embodiments may compress the winding and provide an insulating coating, for example kapton.

In the example of blocks 135 and 140, conductors B1 and B4, B2 and B5, and B3 and B6 form complementary pairs of conductors. In each pair, one conductor can be wound clockwise around the circumference of the stator and the other conductor can be wound counter-clockwise around the circumference of the stator. Clockwise and counter-clockwise as used herein refer to the direction of the winding around the circumference of the stator between its phase lead end and phase neutral end, which corresponds to the direction of the current flowing around the stator through that winding, when viewed orthogonally to a face of the stator. In some embodiments, in each pair the phase lead end of one conductor can enter the stator at outer slot layer L8 and the phase lead end of the other conductor can enter the stator at inner slot layer L1. As such, the phase lead ends of half of the conductors for each phase can enter the stator through an outer slot layer and be wound around the stator in a first direction, and the phase lead ends of the other half of the conductors for each phase can enter the stator through an inner slot layer and be wound around the stator in a second direction opposite the first direction. Because of the continuous winding structure and winding pattern, nested end turns of conductors B1-B6 will form a portion of one crown passing over each end face of the stator above and below each of blocks 135 and 140. The portion of conductor B3 passing above one end face is shown by the solid line representation and the portion of conductor B3 passing below the other end face is shown by the dashed line representation in FIG. 1C. Thus, the layer alternation and opposite winding directions of complementary pairs of conductors contributes to the compact nature of the disclosed windings by filling twice as many layers within the stator slots as there are circular rows of crowns outside the stator.

Figure 2A:
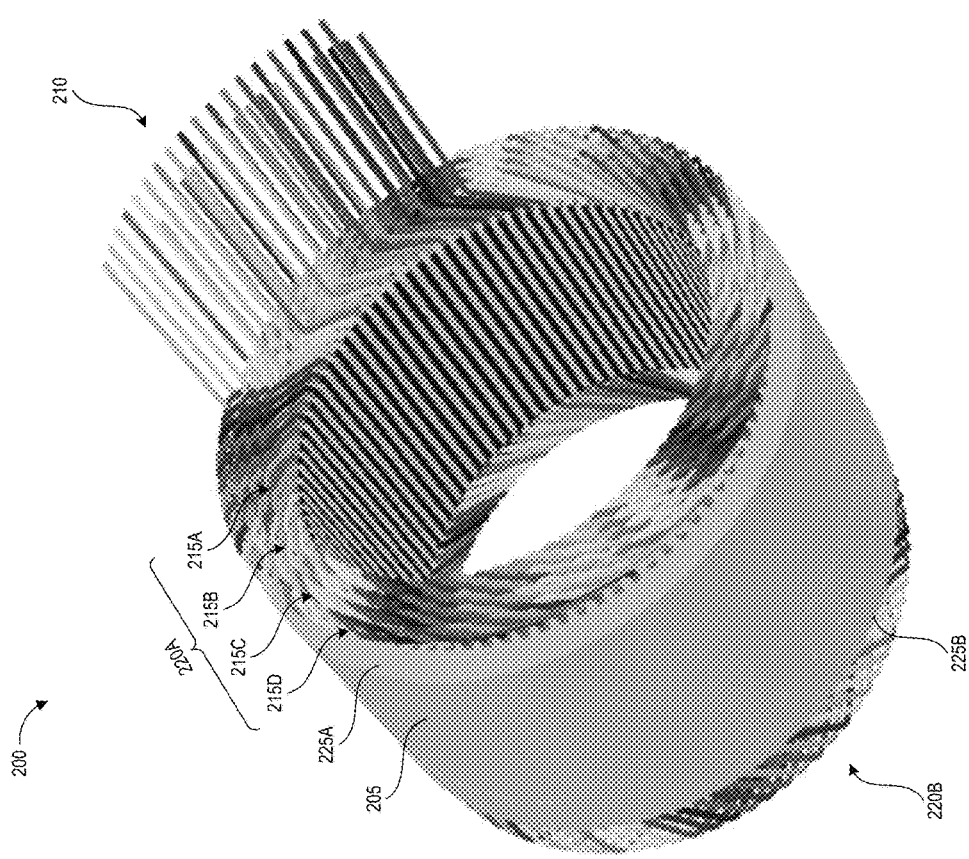
FIG. 2A illustrates a perspective view of an example stator and winding configured according to the disclosed design.
Figure 2B:
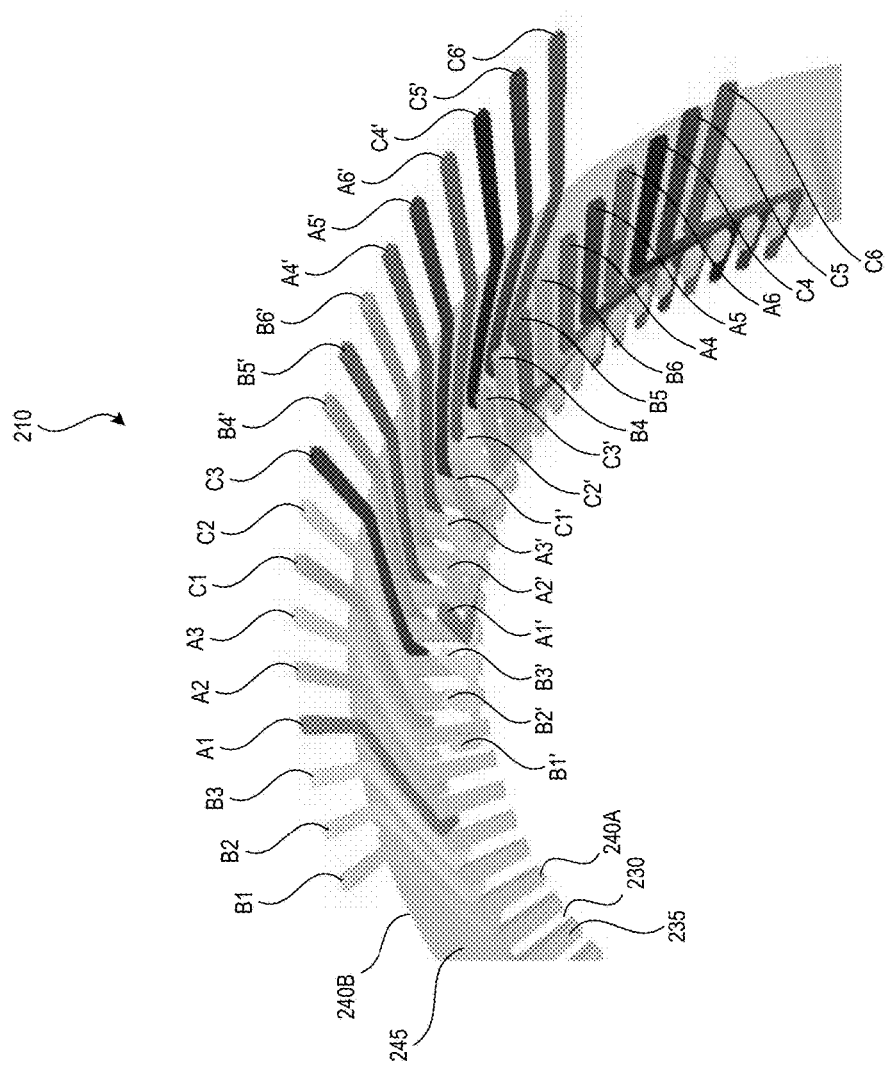
FIG. 2B illustrates, for each of the conductors of the winding of FIG. 2A, the phase lead entering the stator through a first face and the phase neutral exiting the stator through the first face.
Figure 2C:
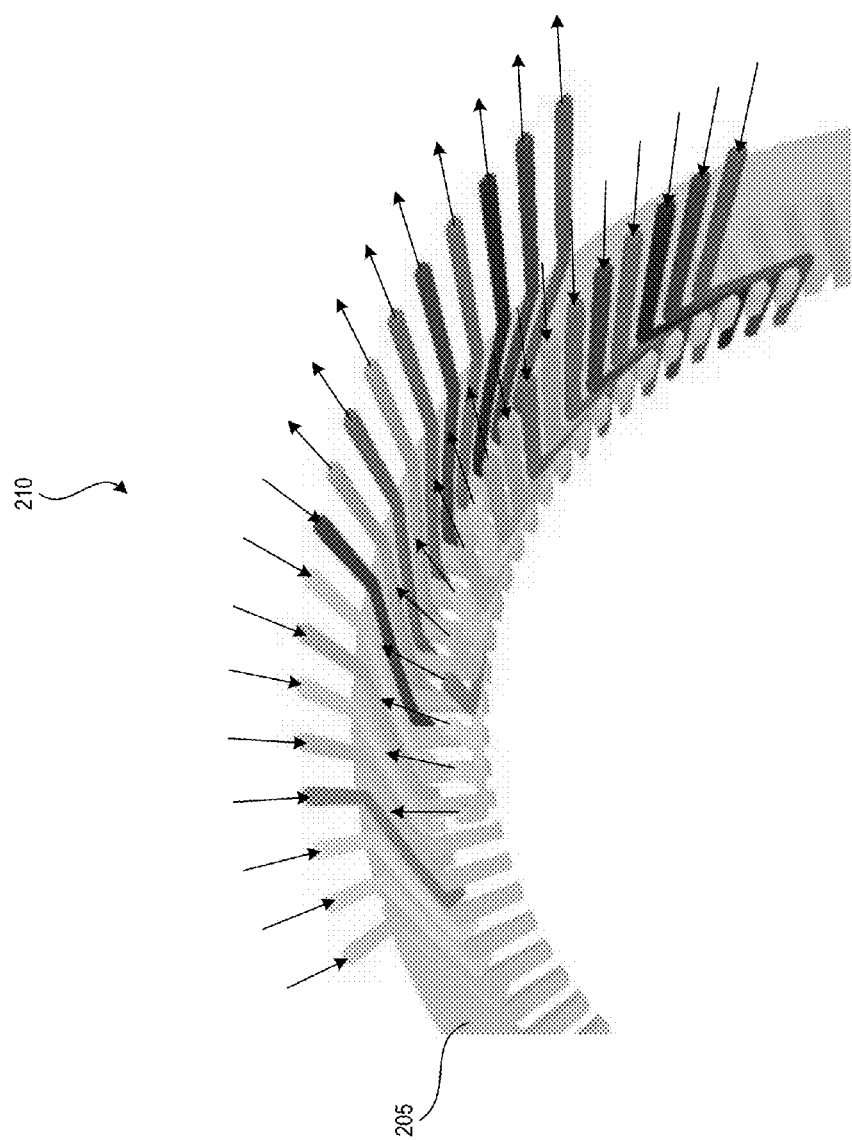
FIG. 2C illustrates an example current flow direction for the phase lead and phase neutral of each of the conductors of the winding of FIG. 2A.

FIG. 2A illustrates a perspective view 200 of an example stator 205 and windings 210 configured according to the disclosed design. FIG. 2B illustrates, for each of the conductors of the winding 210 of FIG. 2A, the phase lead entering the stator through a first face 225A and the phase neutral exiting the stator through the first face 225A. FIG. 2C illustrates an example current flow direction for the phase lead and phase neutral of each of the conductors of the winding of FIG. 2A. FIGS. 2A-2C are described together below.

The stator 205 can be of generally cylindrical form having a first end face 225A and a second end face 225B, an inner diameter 240A and an outer diameter 240B, a backiron 245 extending from the outer diameter 240B to the base of a number of teeth 235, and teeth 235 extending from the backiron 245 to the inner diameter 240A. The teeth 235 can be separated by a number of slots 230 and the conductive windings 210 can be positioned within the slots 230. In some embodiments of the electric motor, the windings 210 can be continuous windings inserted into the stator slots 230 in a predetermined winding configuration such that each winding has a phase lead (input) end and a neutral (output) end extending above one of the end faces 225A of the stator, as shown in FIG. 2B.

A continuous winding can include a number of generally straight leg portions for positioning within the stator slots 230 and a number of end turns 215A-215D formed in the winding connecting successive leg portions. The end turns 215A-215D can include a bend or a compound bend at an apex of the end turn, and successive end turns in a winding can be positioned alternately above the first and second end faces of the stator. The shape of the bend can provide an amount of displacement between successive leg portions equal to a thickness of the conductor, that is, equal to the span of one slot layer, in order to provide the layer alternation described herein. The illustrated winding includes eight layers and four circular rows of crowns, where the adjacent winding end turns nest with one another to form a compact winding arrangement of two sets of nested crowns 220A, 220B above the first and second end faces 225A, 225B of the stator. In the illustrated example, the winding pattern includes 18 conductors fed in parallel with six conductors per each of the three phases.

FIG. 2B illustrates the winding pattern, showing only the phase lead ends of the 18 conductors entering the stator 205 and neutral ends of each of the 18 conductors exiting the stator 205. FIG. 2C shows the direction of the current flowing into the conductors at the phase lead ends and flowing out of the conductors at the neutral ends. For purposes of illustration, the rest of each of the conductors is not shown in FIGS. 2B and 2C, however in the example winding each conductor winds around the circumference of the stator four times, forming a nested configuration of four crowns while having eight layers of conductors in each stator slot. The phase lead ends of the conductors are denoted by A1-A6, B1-B6, and C1-C6, which denote the phase lead ends of each of the six conductors for carrying current phases A, B, and C. The neutral ends of the conductors are denoted by A1'-A6', B1'-B6', and C1'-C6', which are the opposite ends of respective conductors A1-A6, B1-B6, and C1-C6.

In the illustrated winding pattern, the phase lead ends of a first subset of the conductors A4-A6, B4-B6, and C4-C6 are positioned in an inner layer of the stator slots and the neutral ends of those conductors A4'-A6', B4'-B6', and C4'-C6' are positioned in an outer layer of the stator slots. The phase lead ends of a second subset of the conductors A1-A3, B1-B3, and C1-C3 are positioned in the outer layer of the stator slots and the neutral ends of those conductors A1'-A3', B1'-B3', and C1'-C3' are positioned in the inner layer of the stator slots. Each conductor can wind around the circumference of the stator a number of times between the phase lead end and the neutral end. Each time the conductor winds around the circumference of the stator it can alternate between positions in two adjacent slot layers due to the bend in the end turns, and after winding around the circumference can switch to alternating between an additional two adjacent slots until reaching its phase neutral end at the inner or outer layer of the stator.

As illustrated, the first subset of the conductors A4-A6, B4-B6, and C4-C6 can enter the stator through the face 225A and wind around the circumference in a clockwise direction when viewed orthogonally to the face 225A. The second subset of the conductors A1-A3, B1-B3, and C1-C3 can enter the stator through the face 225A and wind around the circumference in a counter-clockwise direction when viewed orthogonally to the face 225A. Corresponding conductors in the first and second subsets can form a pair that alternate between the layers of the same stator slots together. For example, in the A phase conductors A1 and A4 can form a pair, conductors A2 and A5 can form a pair, and conductors A3 and A6 can form a pair. In the B phase conductors B1 and B4 can form a pair, conductors B2 and B5 can form a pair, and conductors B3 and B6 can form a pair. In the C phase conductors C1 and C4 can form a pair, conductors C2 and C5 can form a pair, and conductors C3 and C6 can form a pair. Accordingly, each stator slot can have only a single phase of conductors with current flowing in opposite directions through the slot in adjacent layers. Due to the pairing of the conductors and the layer alternation, the winding pattern forms four crowns while filling eight layers of stator slots. The illustrated winding pattern has three adjacent slots with B phase conductors with the next three adjacent slots having A phase conductors and the next three adjacent slots having C phase conductors, with this pattern repeating all the way around the circumference of the stator. In other embodiments the stator design or winding pattern can have different numbers of circular rows and a corresponding double number of conductors in each stator slot, and can have a different pattern of phase positioning around the stator circumference.

FIG. 3 illustrates a high-level schematic view of an example three-phase, 18 conductor stator winding. Each of three phases A, B, and C have six conductors A1-A6, B1-B6, and C1-C6 connected in parallel. The phase leads A, B, and C can be connected to electrical leads from a three-phase inverter in some examples. Each phase of conductors is also connected to a phase neutral end A', B', C'. Some embodiments of the stator backiron and tooth design disclosed herein can be used with alternate winding patterns than that shown in FIGS. 1A-2C, where the alternate winding patterns provide for six conductors fed in parallel for each of three phases as shown in FIG. 3.

Overview of Comparison with Existing Stator

FIG. 4A illustrates an example portion 400A of a known design of a stator topology. The portion 400A can be repeated ten times around the circumference to form the complete stator. The portion 400A of the stator illustrates stator backiron 420A and teeth 405A. The portion 400A of the stator includes six slots 410A, and the entire stator includes sixty slots. Each slot 410A contains four conductors 425A; though not illustrated the conductors of the design of FIG. 4A can be formed as hairpin conductors as described above. Further, the winding pattern of the design of FIG. 4A includes two conductors fed in parallel for each of three phases of current. One magnetic pole of an example rotor 410 is shown positioned within the stator with slots and permanent magnets arranged in a double-layer nested-v configuration.

FIG. 4B illustrates an example portion 400B of a redesign according to the present disclosure of the topology shown in FIG. 4A. One magnetic pole of the example rotor 410 is shown positioned within the stator with slots and permanent magnets arranged in a double-layer nested-v configuration. The portion 400B can be repeated ten times around the circumference to form the complete stator. The portion 400B of the stator illustrates stator backiron 420B, which has a reduced thickness compared to the backiron 420A of the example of FIG. 4A. As a result, the design of the stator of FIG. 4B can capture more flux into the stator than the design of FIG. 4A.

Though not illustrated, tooth tips of the teeth 405B can also be also wider than the tips of the teeth 405A, further contributing to capturing more flux into the stator of FIG. 4B than with the design of FIG. 4A. Further, each tooth 405B and slot 415B is narrower than in the design of FIG. 4A and there is a higher radial density of teeth and slots, thereby reducing harmonics in the flux density which in turn reduces core losses.

The portion 400B of the stator includes nine slots 410B, and the entire stator includes ninety slots. Each slot 410B contains eight conductors 425B, for example continuous windings with nested end turns and wound through the stator in a winding pattern as described herein. The conductors 425B can be radially inserted and provide for an increased percentage of conductor material in each slot compared to the design shown in FIG. 4A, thereby providing an increased slot fill factor and reduction in winding resistance. Further, usage of the continuous windings as described herein provides for increased reliability of the windings during usage of the motor compared to the hairpin conductors used in the design of FIG. 4A, which can lengthen the lifespan of the motor. As described above, the winding pattern can include six conductors fed in parallel for each of the three phases of electric current provided to the motor, providing for an increased number of parallel conductors relative to the design of FIG. 4A. Additionally, the compact arrangement of the continuous windings of FIG. 4B allow the motor to be housed in a smaller enclosure than a motor with the stator design shown in FIG. 4A, which can be desirable for example in an electric vehicle or in other applications where space constraints are placed on a motor.

Figure 5:
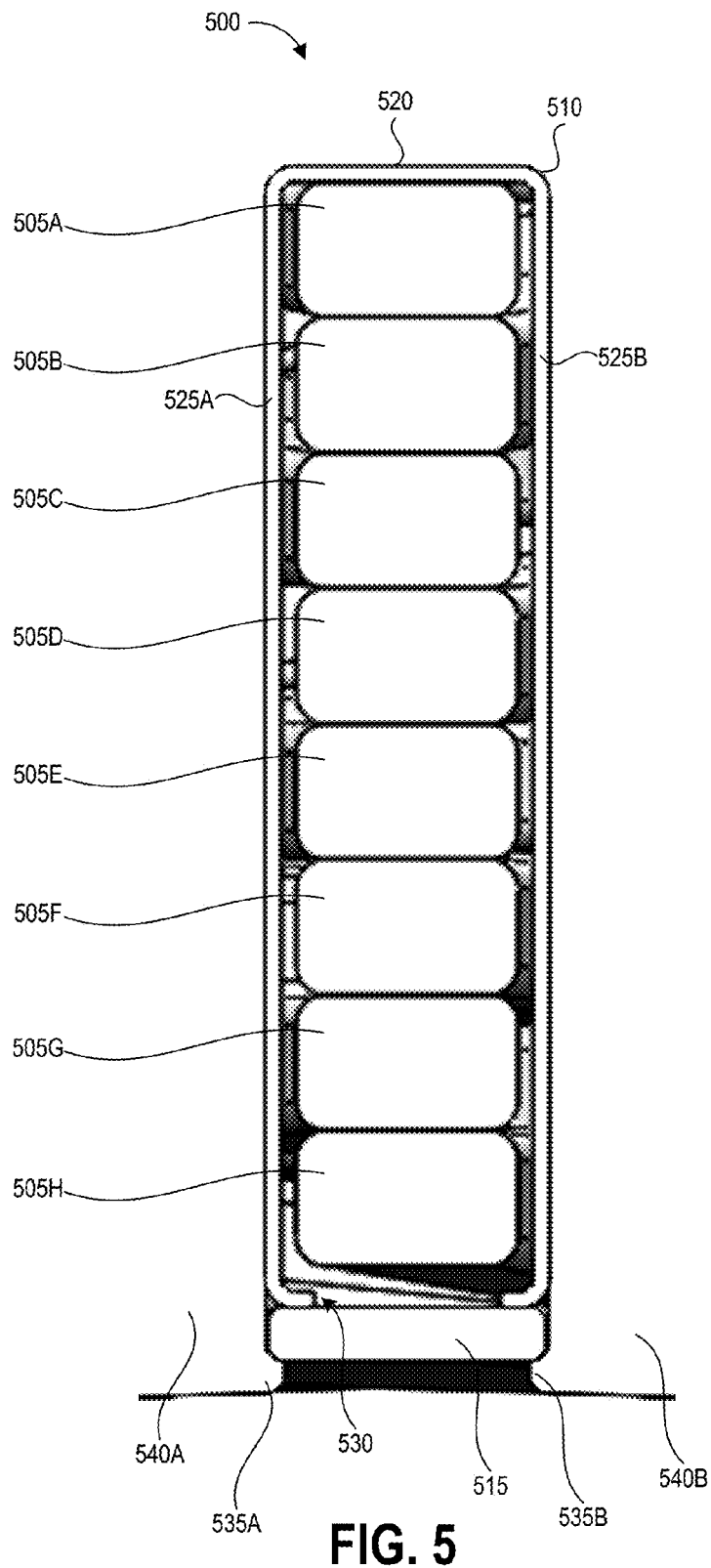
FIG. 5 an enlarged view of a stator slot with an example conductors, slot liner, and wedge configuration.

FIG. 5 illustrates an enlarged view of a cross-section of a stator slot 500 with an example conductors 505A-505H, slot liner 510, and wedge 515 configuration. Each slot liner 510 may be formed from a single or monolithic piece of high temperature, dielectric material. Once formed, the slot liner 510 can be inserted into the stator slot 500, for example axially through a face of the stator, prior to radial insertion of the conductors 505A-505H. The slot liner 510 can have a back wall 520 positioned adjacent to the stator backiron, two opposing side walls 525A, 525B, and an open end 530 positioned adjacent to the stator tooth tips 535A, 535B. During radial insertion of conductors 505A-505H the opposing side walls 525A, 525B of slot liner 510 can be positioned substantially flat against the stator teeth 540A, 540B to enable insertion of conductors 505A-505H into the slot 500 between the stator tooth tips 535A, 535B. The stator tooth tips 535A, 535B can prevent the slot liner 510 from becoming bunched or compacted during insertion of the conductors 505A-505H by having the thickness of the side walls 525A, 525B be equal to or less than the distance the stator tooth tips 535A, 535B protrude inward into the slot 500 from the teeth 540A, 540B.

The slot liner 510 can prevent the enamel of the conductors from becoming scratched or damaged by the material of the teeth 540A, 540B during insertion. Slot liner 510 can also provide electrical isolation of the conductors 505A-505H from the stator. To increase power density of the motor, the slot liner 510 can be the smallest thickness possible while still providing the required level of electrical isolation. After insertion wedge 515 can be inserted between the conductor 505H and the stator tooth tips 535A, 535B to maintain a compact positioning of the conductors 505A-505H within the slot 500, thereby bending a portion of the opposing side walls 525A, 525B around the conductor 505H between the conductor 505H and the wedge 515.

Overview of Example Drive Systems Implementing IPMs

Figure 6:
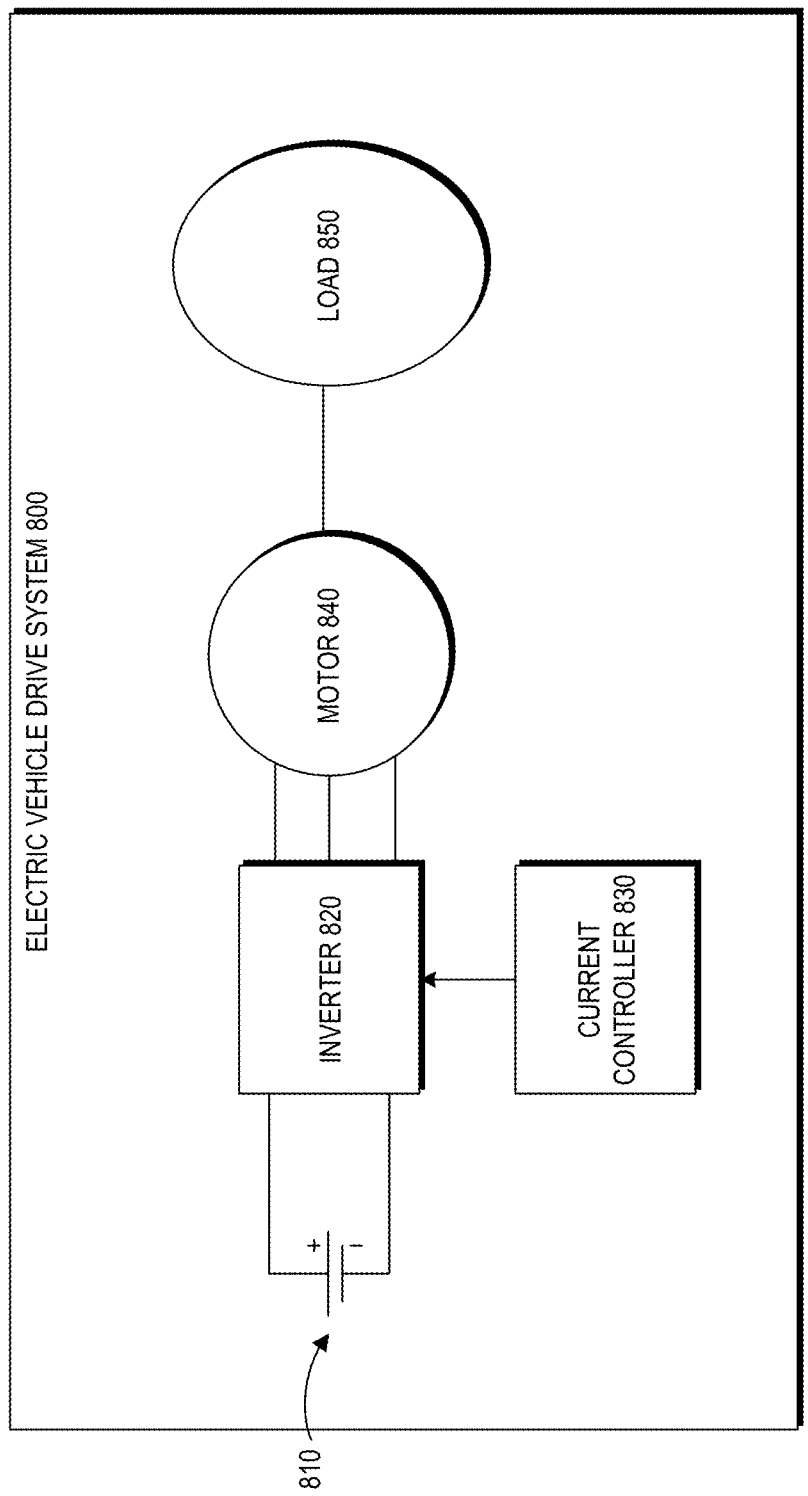
FIG. 6 illustrates a block diagram of an example electric vehicle drive system including an IPM motor as described herein.

FIG. 6 depicts a block diagram of an example electric vehicle drive system 800 including a motor 840 as described herein. The electric vehicle drive system 800 includes a voltage source 810, inverter 820 coupled to the voltage source, current controller 830, motor 840, and load 850. The inverter 820 can be coupled to the motor 840 by a bus bar unit in some embodiments.

The voltage source 810 is typically a single phase direct current (DC) source; however, single and multi-phase alternating current (AC) outputs are also possible. In some embodiments, voltage source 810 represents a rechargeable electric vehicle battery or traction battery used to power the propulsion of an electric vehicle including the drive system 800.

Inverter 820 includes power inputs which are connected to conductors of the voltage source 810 to receive one of DC power, single-phase electrical current or multi-phase electrical current. Additionally, the inverter 820 includes an input which is coupled to an output of current controller 830, described further below. The inverter 820 also includes three outputs representing three phases with currents that can be separated by 120 electrical degrees, with each phase provided on a conductor coupled to the motor 840, for example via a bus bar as described herein. It should be noted that in other embodiments inverter 820 may produce greater or fewer than three phases, and the number of phase lead bus bars in the bus bar unit can be modified accordingly.

The motor 840 is fed from voltage source inverter 820 controlled by current controller 830. The bus bar phase inputs of motor 840 are coupled to respective windings distributed about a stator. The motor 840 can be coupled to a mechanical output, for example a mechanical coupling between the motor 840 and mechanical load 850. Mechanical load 850 may represent one or more wheels of the electric vehicle.

Controller 830 can be used to generate gate signals for the inverter 820. Accordingly, control of vehicle speed is performed by regulating the voltage or the flow of current from the inverter 820 through the stator of the motor 840. There are many control schemes that can be used in the electric vehicle drive system 800 including current control, voltage control, and direct torque control. Selection of the characteristics of inverter 820 and selection of the control technique of the controller 830 can determine efficacy of the drive system 800.

Although not illustrated, the electric vehicle drive system 800 can include one or more position sensors for determining position of the rotor of motor 840 and providing this information to the controller 830. For example, the motor 840 can include a signal output that can transmit a position of a rotor assembly of the motor 840 with respect to the stator assembly motor 840. The position sensor can be, for example, a hall-effect sensor, potentiometer, linear variable differential transformer, optical encoder, or position resolver. The saliency exhibited by motor 840 can also allow for sensorless control applications. The saliency signature of motor 840 can be strong enough that it can be used to determine rotor position at standstill and low speed operating conditions. Some sensorless designs can use saliency mapping at low speeds and then transition to a back-EMF observer model as the motor 840 speeds up.

Although not illustrated, the electric vehicle drive system 800 can include one or more current sensors for determining phase currents of phase lead bus bars and/or stator windings and providing this information to the controller 830. The current sensor can be, for example, a hall-effect current sensor, a sense resistor connected to an amplifier, or a current clamp.

It should be appreciated that while the motor 840 is depicted as an electrical machine that can receive electrical power to produce mechanical power, it can also be used such that it receives mechanical power and thereby converts that to electrical power. In such a configuration, the inverter 820 can be utilized to excite the winding using a proper control and thereafter extract electrical power from the motor 840 while motor 840 is receiving mechanical power.

Implementing Systems and Terminology

Implementations disclosed herein provide design for an interior permanent magnet machine with improved performance.

The systems and methods above have been described in general terms as an aid to understanding details of preferred embodiments of the present invention. Other preferred embodiments of the present include the described application for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A three-phase electric machine comprising:
   a rotor;
   a stator positioned around the rotor, the stator comprising:
      first and second end faces;
      a plurality of teeth separated by a plurality of slots, wherein an interior of each of the plurality of slots defines a plurality of slot layer positions; and
   a plurality of continuous windings comprising:
      a first plurality of conductors corresponding to a first phase of electric current, the first plurality of conductors radially inserted into a first subset of the plurality of slots of the stator,
      a second plurality of conductors corresponding to a second phase of electric current, the second plurality of conductors radially inserted into a second subset of the plurality of slots of the stator, and
      a third plurality of conductors corresponding to a third phase of electric current, the third plurality of conductors radially inserted into a third subset of the plurality of slots of the stator,
      each of the first, second, and third plurality of conductors having a phase lead end and a phase neutral end;
   wherein the plurality of slots of the stator contains three slots for each of the first, second and third phases of electric current per pole of the rotor;
   wherein each slot contains at least two continuous windings of the plurality of continuous windings of a given phase of electric current;
   wherein each of the at least two continuous windings is wound in four layers in each slot, and
   wherein, for a pair of continuous windings in each slot, in a first slot layer position of the plurality of slot layer positions and a second slot layer position of the plurality of slot layer positions adjacent the first slot layer position, the pair of continuous windings occupy alternating layer positions of the first and second slot layer positions.

2. The three-phase electric machine of claim 1, wherein a first winding of the pair of continuous windings is wound around a circumference of the stator in a first direction, and wherein a second winding of the pair of continuous windings is wound around a circumference of the stator in a second direction opposite the first direction.

3. The three-phase electric machine of claim 1, wherein a first slot of the first subset of the plurality of slots has two of the plurality of continuous windings of the first phase of electric current and a second slot of the first subset of the plurality of slots has four of the plurality of continuous windings of the first phase of electric current.

4. The three-phase electric machine of claim 1, wherein:
   the stator comprises an inner circumference, and outer circumference, and a backiron extending between the outer circumference and a base of the plurality of teeth;
   an outer slot layer position of the plurality of slot layer positions is adjacent to the backiron of the stator and an inner slot layer position of the plurality of slot layer positions is adjacent to the inner circumference of the stator;

the phase lead end of a first winding of the pair of continuous windings enters the stator at the outer slot layer position; and the phase lead end of a second winding of the pair of continuous windings enters the stator at the inner slot layer position.

5. The three-phase electric machine of claim 4, wherein the phase neutral end of the first winding exits the stator at the inner slot layer position, and wherein the phase neutral end of the second winding exits the stator at the outer slot layer position.

6. The three-phase electric machine of claim 1, each conductor of the first, second, and third plurality of conductors comprising:
a rectangular cross-section defining first, second, third, and fourth exterior faces of the conductor,
a plurality of end turns formed in the conductor, and
a plurality of linear segments of the conductor, wherein pairs of successive linear segments of the plurality of linear segments are connected by an end turn of the plurality of end turns, and wherein each linear segment of the plurality of linear segments is positioned in a corresponding one of the plurality of slots with the first exterior face facing the rotor.

7. The three-phase electric machine of claim 6, wherein each end turn of the plurality of end turns comprises first and second linear segments joined by a bent segment, wherein the bent segment includes a compound bend formed in the conductor at a peak of the end turn.

8. The three-phase electric machine of claim 7, wherein the compound bend is shaped such that, in a single winding of the conductor around circumference of the stator, successive linear segments are positioned in the alternating layers of the plurality of slot layer positions.

9. The three-phase electric machine of claim 1, wherein the first plurality of conductors is wound through the first subset of the plurality of slots in a repeating block pattern including a first block and a second block.

10. The three-phase electric machine of claim 9, wherein:
in the first block, a first conductor of a first winding of the pair of continuous windings is positioned in the first slot layer position in a first slot of the plurality of slots and, in the second block, the first conductor is positioned in the second slot layer position in a second slot of the plurality of slots; and
in the first block, a second conductor of a second winding of the pair of continuous windings is positioned in the second slot layer position in the first slot and, in the second block, the second conductor is positioned in the first slot layer position in the second slot of the plurality of slots.

11. The three-phase electric machine of claim 9, wherein the first plurality of conductors comprises six conductors, and wherein each of the first block and the second block comprises linear segments of the six conductors positioned in the first and second slot layer positions across three adjacent slots of the plurality of slots, the six conductors forming three of the pairs of continuous windings.

12. The three-phase electric machine of claim 1, wherein the plurality of slots comprise ninety slots, and wherein each of the first, second, and third plurality of conductors comprises six conductors fed with the respective first, second, and third phases of electric current in parallel.

13. The three-phase electric machine of claim 1, wherein the phase lead end of each of the first, second, and third plurality of conductors is electrically coupled to a source of the respective first, second, and third phases of electric current.

14. The three-phase electric machine of claim 13 wherein phase neutral ends of each of the first, second, and third plurality of conductors are electrically coupled to form six neutrals each connecting one conductor from each of the first, second, and third plurality of conductors.

15. A multi-phase electric machine comprising:
a rotor;
a stator positioned around the rotor, the stator comprising:
first and second end faces;
a plurality of teeth separated by a plurality of slots, wherein an interior of each of the plurality of slots defines a plurality of slot layer positions; and
a plurality of continuous windings, each of the plurality of continuous windings comprising one of a plurality of conductors, each of a plurality of phase subsets of the plurality of conductors corresponding to one phase of a plurality of phases of electric current, each conductor of the plurality of phase subsets radially inserted into a corresponding one of a plurality of subsets of the plurality of slots of the stator,
wherein, for each phase subset of the plurality of phase subsets, in a first slot layer position of the plurality of slot layer positions and a second slot layer position of the plurality of slot layer positions adjacent the first slot layer position, a pair of conductors occupies alternating layer positions of the first and second slot layer positions in respective subsets of the plurality of slots, and wherein each of at least two conductors of the respective phase subset of the plurality of phase subsets is layered four times in a first slot of the plurality of slots.

16. The multi-phase electric machine of claim 15, wherein a first conductor of the pair of conductors is wound around a circumference of the stator in a first direction, and wherein a second conductor of the pair of conductors is wound around a circumference of the stator in a second direction opposite the first direction.

17. The multi-phase electric machine of claim 15, wherein:
the stator comprises an inner circumference, and outer circumference, and a backiron extending between the outer circumference and a base of the plurality of teeth;
an outer slot layer position of the plurality of slot layer positions is adjacent to the backiron of the stator and an inner slot layer position of the plurality of slot layer positions is adjacent to the inner circumference of the stator;
the phase lead end of a first conductor of the pair of conductors enters the stator at the outer slot layer position; and
the phase lead end of a second conductor of the pair of conductors enters the stator at the inner slot layer position.

18. A stator for an electric machine, the stator comprising:
an inner circumference and an outer circumference;
first and second end faces;
a plurality of teeth separated by a plurality of slots, wherein an interior of each of the plurality of slots defines a plurality of slot layer positions;
a first continuous winding of a plurality of continuous windings comprising first and second linear segments connected by a first end turn, the first end turn passing over the first end face over a number of slots, wherein the first linear segment is positioned in a first slot layer of a first slot and the second linear segment is positioned in a second slot layer in a second slot, the first and second slots separated by the number of slots; and a second continuous winding of the plurality of continuous windings comprising third and fourth linear segments connected by a second end turn, the second end turn passing over the second end face over the number of slots, wherein the third linear segment is positioned in the second slot layer of the first slot and the fourth linear segment is positioned in the first slot layer in the second slot, and wherein each of at least two continuous windings of the plurality of continuous windings is layered four times in at least one slot of the plurality of slots.

19. The stator of claim 18, wherein the first and second continuous windings wind around a circumference of the stator in opposing directions.

20. The stator of claim 18, wherein:

the stator comprises a backiron extending between the outer circumference and a base of the plurality of teeth;

an outer slot layer position of the plurality of slot layer positions is adjacent to the backiron of the stator and an inner slot layer position of the plurality of slot layer positions is adjacent to the inner circumference of the stator;

a phase lead end of the first continuous winding enters the stator at the outer slot layer position; and a phase lead end of the second continuous winding enters the stator at the inner slot layer position.

21. The stator of claim 20, wherein the phase lead end of each of the first and second continuous windings is coupled to a source of a phase of electric current.

22. The stator of claim 18, wherein the plurality of slots comprise 90 slots.

\* \* \* \* \*